(12) United States Patent
Enzerink et al.

(10) Patent No.: US 8,486,532 B2
(45) Date of Patent: Jul. 16, 2013

(54) NON-FOULING SURFACES FOR REFLECTIVE SPHERES

(75) Inventors: Robert Enzerink, Davis, CA (US); R. Hugh Daniels, Mountain View, CA (US)

(73) Assignee: Nanosys, Inc., Milpitas, CA (US)

( * ) Notice: Subject to any disclaimer, the term of this patent is extended or adjusted under 35 U.S.C. 154(b) by 0 days.

(21) Appl. No.: 13/301,564

(22) Filed: Nov. 21, 2011

(65) Prior Publication Data

US 2012/0064294 A1    Mar. 15, 2012

Related U.S. Application Data

(62) Division of application No. 12/432,264, filed on Apr. 29, 2009, now Pat. No. 8,364,243.

(60) Provisional application No. 61/071,477, filed on Apr. 30, 2008.

(51) Int. Cl.
*B32B 5/16*        (2006.01)

(52) U.S. Cl.
USPC ........... 428/403; 428/404; 428/405; 428/406; 428/447

(58) Field of Classification Search
CPC ........................................ B32B 5/16
USPC ........................................ 428/403–407, 447
See application file for complete search history.

(56) References Cited

U.S. PATENT DOCUMENTS

| | | | |
|---|---|---|---|
| 5,332,910 | A | 7/1994 | Haraguchi et al. |
| 5,997,832 | A | 12/1999 | Lieber et al. |
| 6,036,774 | A | 3/2000 | Lieber et al. |
| 6,225,198 | B1 | 5/2001 | Alivisatos et al. |
| 6,265,061 | B1 | 7/2001 | Kang et al. |
| 6,351,659 | B1 | 2/2002 | Vilsmeier |
| 6,767,587 | B1 | 7/2004 | Brown |
| 6,855,202 | B2 | 2/2005 | Alivisatos et al. |
| 6,978,896 | B2 | 12/2005 | Budd et al. |
| 7,041,623 | B2 * | 5/2006 | Kirkland et al. ............. 502/439 |
| 7,056,409 | B2 | 6/2006 | Dubrow |
| 7,137,712 | B2 | 11/2006 | Brunner et al. |
| 7,579,077 | B2 | 8/2009 | Dubrow et al. |
| 7,972,696 | B2 * | 7/2011 | Sandmeyer et al. .......... 428/404 |
| 2002/0150725 | A1 | 10/2002 | Nun et al. |
| 2003/0013795 | A1 * | 1/2003 | Nun et al. ..................... 524/442 |
| 2003/0194490 | A1 * | 10/2003 | Budd et al. ................... 427/212 |

(Continued)

FOREIGN PATENT DOCUMENTS

DE    2020070100    11/2007
WO      9629629      9/1996

(Continued)

OTHER PUBLICATIONS

Cui, Y. et al., "Doping and electrical transport in silicon wires" J Phys Chem (2000) 104:5213-5216.

(Continued)

*Primary Examiner* — Hoa (Holly) Le
(74) *Attorney, Agent, or Firm* — Andrew L. Filler

(57) ABSTRACT

The present invention relates to treating of reflective surfaces to prevent fouling. The present invention also relates to reflective materials treated to prevent fouling, as well as methods of using such reflective materials.

6 Claims, 3 Drawing Sheets

U.S. PATENT DOCUMENTS

| | | | |
|---|---|---|---|
| 2005/0038498 A1 | 2/2005 | Dubrow et al. | |
| 2005/0137289 A1 | 6/2005 | Hooftman et al. | |
| 2005/0181195 A1 | 8/2005 | Dubrow | |
| 2006/0140464 A1 | 6/2006 | Feilkas et al. | |
| 2006/0204738 A1 | 9/2006 | Dubrow et al. | |
| 2007/0183041 A1 | 8/2007 | McCloy et al. | |
| 2007/0282247 A1 | 12/2007 | Desai et al. | |
| 2007/0298216 A1 | 12/2007 | Jing et al. | |
| 2009/0275826 A1* | 11/2009 | Enzerink et al. | 600/424 |

FOREIGN PATENT DOCUMENTS

| | | |
|---|---|---|
| WO | 0217362 | 2/2002 |
| WO | 02080280 | 10/2002 |
| WO | 2005022120 | 3/2005 |

OTHER PUBLICATIONS

Cui, Y. et al., "Diameter-controlled synthesis of single-crystal silicon nanowires" Appl Phys (2001) 78(15):2214-2216.

Duan, X. et al., "General synthesis of compound semiconductor nanowires" Adv Mat (2000) 12:298-302.

Feng, L. et al. "Super-hydrophobic surfaces: from natural to artificial" Adv Mater (2002) 14(24):1857-1860.

Feng, L. et al. "Superhydrophobicity of nanostructured carbon films in a wide range of pH values" Angew Chem Int Ed (2003) 42:4217-4220.

Gudiksen, M.S. et al., "Diameter-selective synthesis of semiconductor nanowires" J Am Chem Soc (2000) 122:8801-8802.

Gudiksen, M.S. et al., "Synthetic control of the diameter and length of single crystal semiconductor nanowires" J Phys Chem (2001) 105:4062-4064.

Gumprecht, H.K. et al. "BrainLab VectorVision Neuronavigation System: Technology and Clinical Experiences in 131 Cases" (1999) 44(1):97-105.

Haraguchi, K. et al., "Polarization Dependence of Ligh Emitted from GaAs p—n junctions in quantum wire crystals" J Appl Phys (1994) 75(8):4220-4225.

Haraguchi, K. et al., "Self-organized fabrication of planar GaAs nanowhisker arrays" Appl Phys Lett (1996) 69 (3):386-387.

Hiruma, K. et al., "GaAs free-standing quantum-size wires" J Appl Phys (1993) 74(5):3162-3171.

Langlotz, F. "Potential pitfalls of computer aided orthopedic surgery" Injury (2004) 35:S-A17-S-A23.

Morales, A.M. et al., "A laser ablation method for the synthesis of crystalling semiconductor nanowires" Science (1998) 279:208-211.

Peng, X. et al., "Shape control of CdSe nanocrystals" Nature (2000) 404:59-61.

Puntes, V.F. et al., "Colloidal nanocrystal shape and size control: The case of cobalt" Science (2001) 291:2115-2117.

Schon, J.H. et al., "Self-assembled monolayer organic field-effect transistors" Nature (2001) 413:713-716.

Urban, J.J. et al., "Synthesis of single-crystalline perovskite nanowires composed of brium titanate and strontium titanate" J Am Chem Soc (2002) 124:1186-1187.

Wu, Y. et al., "Block-by-block growth of single-crystalline Si/SiGe superlattice nanowires" Nano Lett (2002) 2:83-86.

Yazawa, M. et al., "Semiconductor nanowhiskers" Adv Mat (1993) 5:577-580.

Yun, W.S. et al., "Ferroelectric properties of individual barium titanate nanowires investigated by scanned probe microscopy" Nano Lett (2002) 2(5):447-450.

Zhou, C. et al., "Nanoscale metal/self-assembled monolayer/metal heterostructures" Appl. Phys Lett (1997) 71:611-613.

* cited by examiner

NON-FOULING SURFACES FOR REFLECTIVE SPHERES

CROSS-REFERENCE TO RELATED APPLICATION

The present application is a divisional of U.S. patent application Ser. No. 12/432,264, filed Apr. 29, 2009, which claims the benefit of U.S. Provisional Patent Application No. 61/071,477, filed Apr. 30, 2008, the disclosure of which is incorporated by reference herein in its entirety.

BACKGROUND OF THE INVENTION

1. Field of the Invention

The present invention relates to treating of reflective surfaces to prevent fouling. The present invention also relates to reflective materials treated to prevent fouling, as well as methods of using such reflective materials.

2. Background of the Invention

Reflective or retroreflective materials often fail to achieve optimal performance when the surface of such materials is stained or fouled by externally applied contaminants such as fluids (including biological fluids) or soluble dirt. Fouling of such surfaces reduces the reflective properties of these materials. Therefore, use of reflective materials in environments where fouling can occur, for example, in "dirty" environments (e.g., industrial applications, rain, high humidity) or in the body (or in contact with bodily fluids, e.g., during surgical procedures) is greatly impeded by the loss of reflective characteristics.

What are needed therefore are methods for preventing or limiting fouling of reflective surfaces, thereby maintaining their reflective properties.

BRIEF SUMMARY OF THE INVENTION

The present invention fulfills the needs noted above by providing methods for disposing a liquidphobic structure on the surface of a reflective material so as to limit or prevent fouling of the reflective material, while still maintaining its reflective characteristics. Reflective materials comprising such liquidphobic materials are also provided.

In an embodiment, the present invention provides reflective substrates comprising a liquidphobic structure on a surface of the substrate. Suitably, the substrate substantially maintains its reflective properties after the substrate is contacted with a liquid (e.g., a biological fluid). Exemplary reflective substrates include reflective films, reflective marker dots, reflective tapes, reflective fabrics, retroreflective materials, reflective spheres and reflective cubes.

In suitable embodiments, the liquidphobic structure comprises a hydrophobic coating, including a hydrophobic coating that directly contacts the surface of the substrate. In other embodiments, the hydrophobic coating is disposed on a sub-micron structured surface of the substrate. Exemplary hydrophobic coatings for use in the practice of the present invention include, but are not limited to, perfluorinated organics. Suitably the substrate maintains at least 70% of its reflective properties after contact with a liquid.

In further embodiments, the present invention provides methods of substantially maintaining the reflective properties (suitably at least 70% of the reflective properties are maintained) of a reflective substrate. Suitably, such methods comprise disposing a liquidphobic structure on a surface of the substrate, wherein the reflective properties are substantially maintained after the substrate is contacted with a liquid (e.g., a biological fluid).

Suitably, the methods comprise disposing a hydrophobic coating on the reflective substrate, for example, disposing a hydrophobic coating directly onto the surface of the substrate. In further embodiments, the methods comprise generating a sub-micron-structured surface on the surface of the substrate and disposing a hydrophobic coating (e.g., a perfluorinated organic coating) onto the sub-micron-structured surface. For example, the methods comprise generating a sub-micron-structured surface by disposing a layer of silica particles (suitably sub-micron silica particles) on the reflective substrate. A hydrophobic coating comprising a perfluorinated silane coating can then be disposed on the silica particles.

In further embodiments, the present invention provides methods of disposing a liquidphobic structure on a reflective substrate, comprising generating a sub-micron-structured surface (e.g., a layer of sub-micron silica particles) on the reflective substrate and disposing a liquidphobic structure (e.g., a perfluorinated silane coating) on the sub-micron-structured surface.

In additional embodiments, the present invention provides reflective spheres comprising a hydrophobic coating (e.g., a perfluorinated organic) on a surface of the sphere, wherein the sphere substantially maintains its reflective properties (suitably at least 70% of its reflective properties) after the sphere is contacted with a liquid (e.g., a biological fluid). In suitable embodiments, the surface of the sphere further comprises a sub-micron-structured layer of silica particles and a perfluorinated silane hydrophobic coating.

In still further embodiments, the present invention provides methods of performing a medical procedure using a surgical navigation system on a patient.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1A:
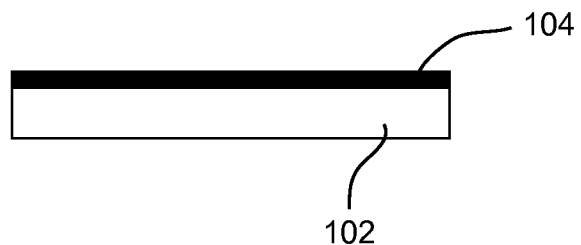
FIGS. 1A-1C show reflective materials comprising liquidphobic structures in accordance with embodiments of the present invention.

The present invention will now be described with reference to the accompanying drawings. In the drawings, like reference numbers indicate identical or functionally similar elements.

It should be appreciated that the particular implementations shown and described herein are examples of the invention and are not intended to otherwise limit the scope of the present invention in any way. Indeed, for the sake of brevity, conventional electronics, manufacturing, semiconductor devices, and nanocrystal, nanoparticle, nanowire (NW), nanorod, nanotube, and nanoribbon technologies and other functional aspects of the systems (and components of the individual operating components of the systems) may not be described in detail herein.

U.S. Patent Application Pub. 20050181195 and U.S. patent application Ser. No. 11/869,508, filed Oct. 9, 2007, are incorporated by reference herein in their entireties for all purposes. These applications relate in part to various methods of forming liquidphobic surfaces.

As used herein, the term "nanostructure" refers to a structure that has at least one region or characteristic dimension with a dimension of less than about 500 nm, including on the order of less than about 1 nm. As used herein the terms "sub-micron-structure" and "sub-micron-structured" refers to a structure that has at least one region or characteristic dimension with a dimension of less than about 1 μm. As used herein, when referring to any numerical value, "about" means a value of ±10% of the stated value (e.g. "about 100 nm" encompasses a range of sizes from 90 nm to 110 nm, inclusive). The term "nanostructure" as used herein encompasses nanoparticles, quantum dots, nanocrystals, nanowires, nanorods, nanoribbons, nanofibers, nanotubes, nanotetrapods and other similar nanostructures known to those skilled in the art. As described throughout, nanostructures (including nanoparticles, nanocrystals, nanofibers, quantum dots, nanowires, etc.) suitably have at least one characteristic dimension less than about 500 nm. Suitably, nanostructures are less than about 500 nm, less than about 300 nm, less than about 200 nm, less than about 100 nm, less than about 50 nm, less than about 20 nm, less than about 15 nm, less than about 10 nm or less than about 5 nm in at least one characteristic dimension (e.g., the dimension across the width or length of the nanostructure).

In one embodiment, the present invention provides reflective substrates comprising a liquidphobic structure on a surface of the substrate, wherein the substrate substantially maintains its reflective properties after being contacted with a liquid.

As shown in FIG. 1A, suitably reflective substrate 102 comprises a liquidphobic structure 104 on at least one surface of substrate 102. As used herein the term "reflective substrate" refers to a material that has at least one surface that reflects light. Reflective substrates also include "retroreflective substrates" which send light or other radiation back in the same direction it initiated from, regardless of the angle of incidence. Light that can be reflected by the various reflective substrates include visible light, as well as non-visible light including, but not limited to, infrared and ultraviolet wavelengths. Exemplary reflective substrates that can be utilized in the practice of the present invention include various films, paints, reflective marker dots, tapes, fabrics and coatings, as well as various structures, such as reflective objects, including reflective spheres, cubes (or any other shape). Reflective substrates also include materials that have a reflective coating or layer on their surface. The terms "reflective substrate" and "reflective material" are used interchangeably throughout.

As used herein, the term "liquidphobic structure" includes liquidphobic coatings, films, layers and portions of such coatings, films and layers. That is, a liquidphobic structure need not completely cover the surface of a reflective substrate, and in suitable embodiments, may cover only a portion of the surface. However, suitably, at least a majority, if not all, of the surface of reflective material that will be reflecting light will be covered with a liquidphobic structure. In further embodiments, a patterned surface can be generated in which portions or sections of the surface comprise a liquidphobic structure, while other portions do not (e.g., hydrophobic and non-hydrophobic sections).

As used herein, "liquidphobic" or "super-liquidphobic" structures describe, in a general sense, any material that displays anti-liquid properties, e.g., a material that is one or more of hydrophobic (repels water), lipophobic (repels oils and lipids), amphiphobic (a material which is both hydrophobic and lipophobic), hemophobic (repels blood or blood components) or the like. Such materials repel liquids, e.g., by causing the liquid to bead-up on the material's surface and not spread out or wet the material's surface. Thus, as used herein, a substrate that is described as comprising a liquidphobic structure includes substrates that comprise a liquidphobic, super-liquidphobic, hydrophobic, super-hydrophobic, amphiphobic and/or super-amphiphobic substrate.

When a drop of a liquid (e.g., water based, lipid based, etc.) rests upon a surface, it will spread out over the surface to a degree based upon such factors as the surface tensions of the liquid and the substrate, the smoothness or roughness of the surface, etc. For example, the liquidphobicity of a substrate can be increased by various coatings that lower the surface energy of the substrate. The quantification of liquidphobicity can be expressed as the degree of contact surface angle (or contact angle) of the drop of the liquid on the surface.

For example, for a surface having a high surface energy (i.e., higher than the surface tension of the liquid drop), a drop of liquid will spread out "wetting" the surface of the substrate. Such surface displays liquidphilicity, as opposed to liquidphobicity. When the surface energy of a substrate is decreased, liquidphobicity is increased (and vice versa). Liquidphobic, including hydrophobic, lipidphobic and/or amphiphobic refer to properties of a substrate which cause a liquid drop on their surface to have a contact angle of 90° or greater. "Super-hydrophobicity," "super-amphiphobicity," and "super-liquidphobicity" all refer to properties of substances which cause a liquid drop on their surface to have a contact angle of 150° or greater.

In suitable embodiments, the liquidphobic structure on the reflective substrate is a hydrophobic structure, such as a hydrophobic coating or film (e.g., a coating that repels water). As shown in FIG. 1A, suitably liquidphobic structure 104 (e.g., a hydrophobic coating) is directly in contact with the surface of reflective material 102. In suitable embodiments, the surface of reflective substrate 102 will comprise a sub-micron structured surface 106, for example, if the reflective substrate comprises reflective microspheres or a similar structure on its surface as in FIG. 1B, onto which a liquidphobic structure 104 is disposed.

Exemplary liquidphobic structures for use in the practice of the present invention include various chemical coatings and films, including those shown below in Table 1. The liquidphobic structure suitably generates an optically clear coating or layer on the reflective substrate so as to not impede or impair the passage of light to and from the reflective surface.

Examples of compounds that can be used to coat the reflective substrates of the present invention beyond those listed in Table 1 are well known to those of skill in the art. Many of the exemplary liquidphobic compounds (including, e.g., hydrophobic, lipophobic, amphiphobic compounds, etc.) in Table 1 can be found in common commercial sources such as chemical catalogues from, e.g., United Chemicals, Sigma-Aldrich, etc. In exemplary embodiments, the reflective substrates can be fluorinated, e.g., treated with a perfluorinated organic compound, such as a perfluorinated silane, e.g., a fluoroalkylsilane group, etc. Exemplary liquidphobic compounds include those created through treatment with silane agents, heptadecafluorodecyltrichlorosilane, perfluorooctyltriclorosilane, heptadecafluorodecyltrimethoxysilane, perfluorododecyltrichlorosilane, perfluorinated carbon chains (e.g., perfluorooctyl trichlorosilane), polyvinyliden fluoride, polyperfluoroalkyl acrylate, octadecanethiol, fluorine compounds (e.g., graphite fluoride, fluorinated monoalkyl phosphates, $C_4F_8$, etc.), etc. In other embodiments, the liquidphobic structures can comprise coatings of fluorocarbons, Teflon®, silicon polymers (e.g., Hydrolam 100®), polypropylene, polyethylene, wax (e.g., alkylketene dimers, paraffin, fluorocarbon wax, etc.), plastic (e.g., isotactic polypropylene, etc.), PTFE (polytetrafluoroethylene), diamond and diamond-like surfaces, as well as inorganic materials. Additional exemplary liquidphobic structures/coatings are listed below in Table 1.

TABLE 1

| Liquidphobicity | Functionality | Chemical Name |
| --- | --- | --- |
| Hydrophobic | C2 | Ethyltrichlorosilane |
| Hydrophobic | C2 | Ethyltriethoxysilane |
| Hydrophobic | C3 | n-Propyltrichlorosilane |
| Hydrophobic | C3 | n-Propyltrimethoxysilane |
| Hydrophobic | C4 | n-Butyltrichlorosilane |
| Hydrophobic | C4 | n-Butyltrimethoxysilane |
| Hydrophobic | C6 | n-Hexyltrichlorosilane |
| Hydrophobic | C6 | n-Hexyltrimethoxysilane |
| Hydrophobic | C8 | n-Octyltrichlorosilane |
| Hydrophobic | C8 | n-Octyltriethoxysilane |
| Hydrophobic | C10 | n-Decyltrichlorosilane |
| Hydrophobic | C12 | n-Dodecyltrichlorosilane |
| Hydrophobic | C12 | n-Dodecyltriethoxysilane |
| Hydrophobic | C18 | n-Octadecyltrichlorosilane |
| Hydrophobic | C18 | n-Octadecyltriethoxysilane |
| Hydrophobic | C18 | n-Octadecyltrimethoxysilane |
| Hydrophobic | C18 | Glassclad-18 |
| Hydrophobic | C20 | n-Eicosyltrichlorosilane |
| Hydrophobic | C22 | n-Docosyltrichlorosilane |
| Hydrophobic | Phenyl | Phenyltrichlorosilane |
| Hydrophobic | Phenyl | Phenyltriethoxysilane |
| Amphiphobic | Tridecafluorooctyl | (Tridecafluoro-1,1,2,2,-tetrahydrooctyl)-1-trichlorosilane |
| Amphiphobic | Tridecafluorooctyl | (Tridecafluoro-1,1,2,2,-tetrahydrooctyl)-1-triethoxysilane |
| Amphiphobic | | Fluorinated alkanes |
| | | Fluoride containing compounds |
| | | Alkoxysilane |
| | | PTFE |
| | | hexamethyldisilazane |
| | | Aliphatic hydrocarbon containing compounds |
| | | Aromatic hydrocarbon containing compounds |
| | | Halogen containing compounds |
| | | Paralyene and paralyene derivatives |
| | | Fluorosilane containing compounds |
| | | Fluoroethane containing compounds |

As discussed throughout, contact between a liquid and a reflective material can result in fouling or otherwise contamination of the surface of a reflective material. Fouling can occur when a reflective material is contacted with a liquid, often containing various unwanted contaminants, such as dirt, debris, oils, salts, lipids, or biological fluids such as blood, urine, saliva, marrow, fat, etc., which contain various elements which can stick to and thus contaminate the surface of a reflective material. Through the addition of a liquidphobic structure, for example a hydrophobic coating to the surface of a reflective material, liquids are repelled from the surface, and thus liquids, including contaminants in the liquids, cannot reach and/or attach to the reflective surface.

Figure 2A:
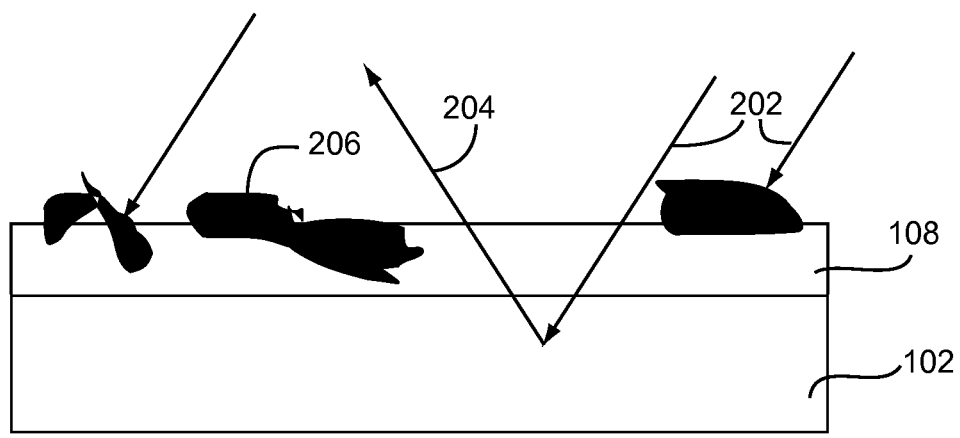
FIGS. 2A-2B show the effect of fouling (2A) on a reflective substrate, and the use of a liquidphobic structure (2B) to prevent fouling and maintain the reflective characteristics of a material.
Figure 2B:
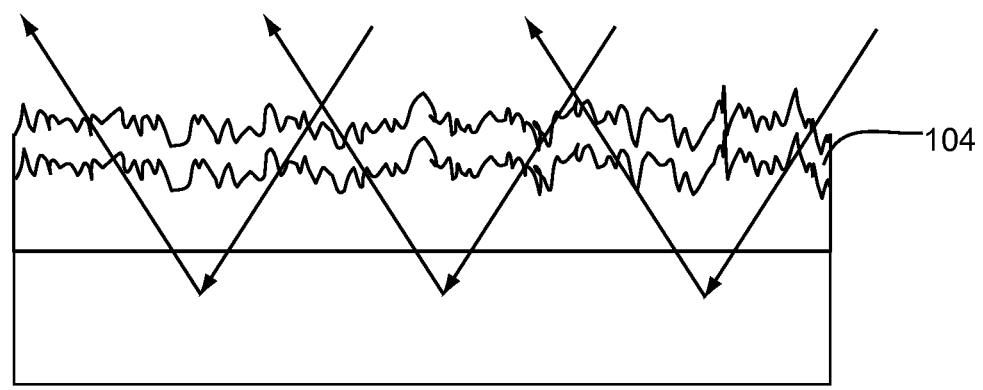
Figure 3A:
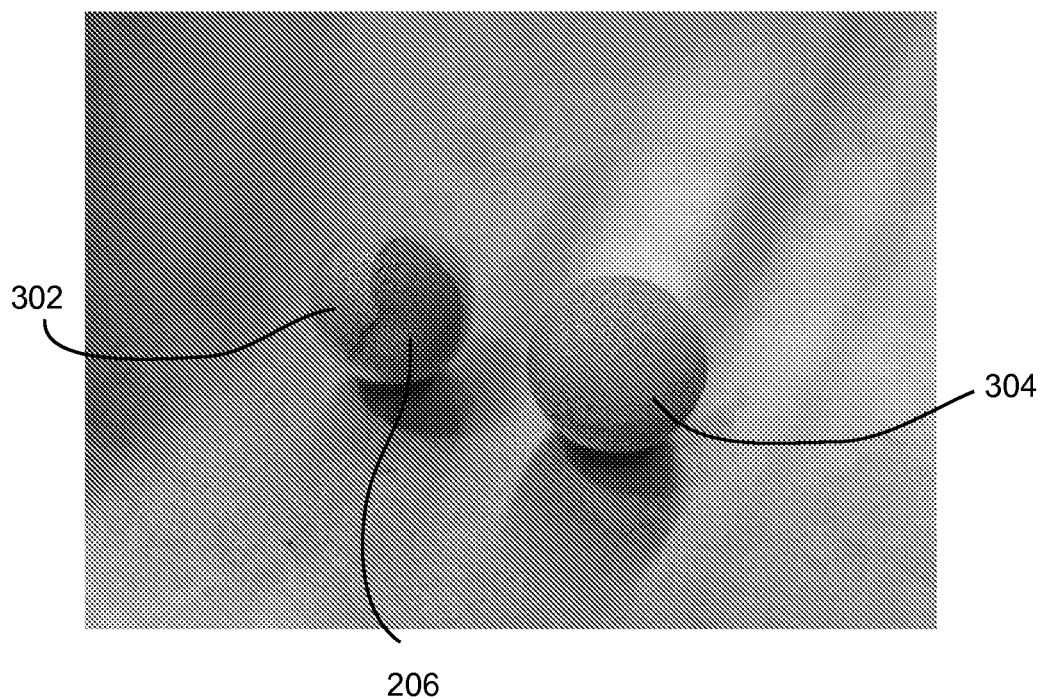
FIGS. 3A-3B show reflective spheres in accordance with one embodiment of the present invention.

For example, contact of a reflective substrate 102 (in this case also comprising a sub-micron-structured surface 108) with a liquid causes fouling on the surface, as in FIG. 2A and as shown with reference to spherical marker 302 in FIG. 3A, where contaminants/liquids 206 attach to the surface. Thus, as in FIG. 2A, light that is directed toward the reflective surface 202 cannot reflect back 204 at all portions of the reflective surface, effectively limiting the reflective properties of the substrate. Disposing a liquidphobic structure 104 on the surface of the reflective substrate limits or effectively eliminates this fouling, as shown in FIG. 2B and with reference to spherical marker 304 shown in FIG. 3A. Thus, as in FIG. 2B, light that is directed toward the surface can be reflected back away from the surface of the reflective substrate.

Figure 3B:
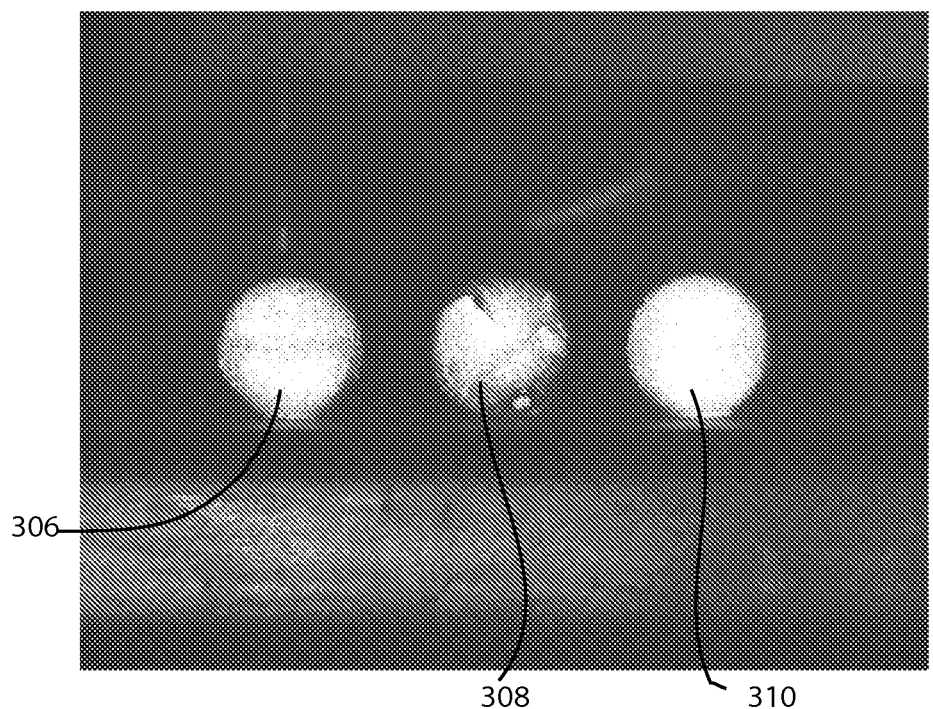

Suitably, the application of a liquidphobic structure to a reflective substrate allows the substrate to maintain its reflective properties after contact with a liquid. As used herein, the term "reflective properties" refers to the ability of a surface to bounce back some or all of the light that strike the surface. This includes bouncing back all of the wavelengths of light that strikes a surface, as well as bouncing back at least some of the wavelengths of light that strike a surface. Thus, reflective properties refers to both the efficiency of bouncing back light (i.e., the intensity that reflects back) as well as the completeness of the spectrum that is reflected, i.e., the percentage of wavelengths that are bounced back. Suitably, the light is bounced back to a receiver or detector. For example, FIG. 3B shows reflective a sphere 306 that has been coated with a liquidphobic substrate and contacted with a blood sample, sphere 308 that has not been treated with a liquidphobic substrate and has been soiled by contaminants from a blood sample, and a sphere 310 that has been treated with a liquidphobic substrate and not contacted with blood. As shown, sphere 306 substantially maintains its reflective properties after being contacted with a blood sample similar to sphere 310 which has not been contacted with blood, while sphere 308 shows a significant degradation in reflective properties following such blood contact. In exemplary embodiments, at least about 100% of the light that strikes a surface is bounced back, or at least about 95%, at least about 90%, at least about 85%, at least about 80%, at least about 75%, at least about 70%, at least about 65%, at least about 60%, at least about 55%, at least about 50%, at least about 45%, at least about 40%, etc., of the light is bounced back from a substrate that comprises a submicron textured surface and a liquidphobic coating as described herein.

The addition of a liquidphobic structure to the surface of a reflective substrate limits or prevents fouling on the surface of the substrate such that the reflective substrate maintains at least about 50% of its reflective properties after contact with a liquid. It is important that the liquidphobic structure does not significantly impair the reflective characteristics of the reflective substrate. In suitable embodiments, the substrate reflects at least about 50% of the light that strikes a surface (i.e., maintains at least about 50% of its reflective properties). More suitably, a substrate maintains at least about 55%, at least about 60%, at least about 65%, at least about 70%, at least about 75%, at least about 80%, at least about 85%, at least about 90%, at least about 95%, at least about 99%, or about 100% of its reflective properties. As used herein, the term "substantially maintain" as used to refer to the reflective characteristics of a reflective substrate is used to indicate that the substrate maintains at least about 50% of its reflective properties after contact with a liquid.

In further embodiments, the present invention provides methods of substantially maintaining the reflective properties of a reflective substrate comprising disposing a liquidphobic structure on a surface of the substrate, wherein the reflective properties are substantially maintained after the substrate is contacted with a liquid.

As noted above, as in FIG. 1A, in suitable embodiments, a liquidphobic structure is disposed directly onto the surface of the substrate. Exemplary reflective substrates are described throughout and include reflective films and marker dots, as well as reflective objects such as reflective spheres or cubes. As noted herein, liquidphobic structures include hydrophobic, lipidphobic, hemophobic and amphiphobic structures. Suitably, the liquidphobic structures are hydrophobic coatings, such as perfluorinated organic coatings, for example, perfluorinated silane coatings.

Figure 1B:
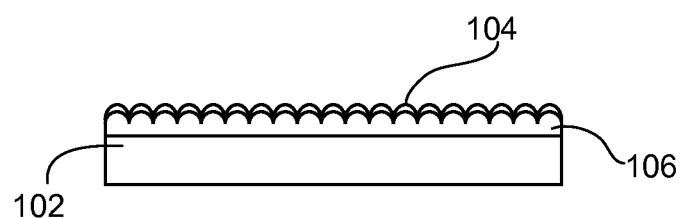

In exemplary embodiments, a liquidphobic structure, e.g., a hydrophobic coating, is directly disposed (e.g., as in FIG. 1A) on the surface of a reflective substrate. Methods for disposing such structures and coatings include, but are not limited to, painting, spraying, layering, dipping, spin-coating, applying, evaporative deposition, etc. As shown in FIG. 1B, suitably a liquidphobic structure, e.g., a hydrophobic coating, is disposed on a sub-micron-structured surface 106.

Disposition of liquidphobic structures onto the surface of reflective substrate 102 suitably requires that the surface of substrate 102 comprise appropriate chemical groups so as to facilitate spreading and/or bonding of the liquidphobic structures to the substrate. For example, in applications where a perfluorinated organic layer is disposed on the substrate, chemically reactive groups that couple to the layer are often required on the substrate, such as silanols on the surface of a substrate onto which a layer of perfluorinated silane is to be disposed, so as to facilitate silane coupling.

In additional embodiments, an adhesive layer can be applied to the surface of the reflective material so as to facilitate interaction between the liquidphobic structures and the reflective material.

Figure 1C:
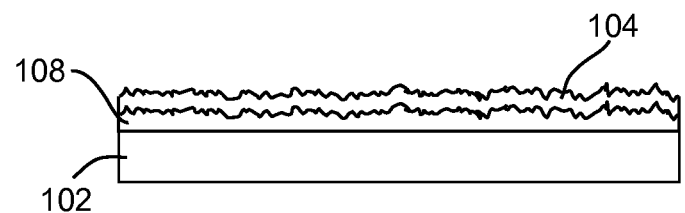

In still further embodiments, a sub-micron-structured surface, e.g., a nano-structured surface, can first be generated on the surface of a reflective substrate, and then a liquidphobic structure (e.g., hydrophobic coating) can be disposed onto the sub-micron-structured surface. For example, as shown in FIG. 1C, where a reflective substrate 102 comprises a sub-micron-structured surface, such as a nano-structured surface 108, which has been generated on the surface of the substrate. Liquidphobic structure 104 can then be disposed directly onto the sub-micron-structured/nano-structured surface 108 using any of the methods described herein. As discussed throughout, in suitable embodiments, various liquidphobic structures, including perfluorinated organic coatings, such as perfluorinated silane coatings, can be disposed on the reflective substrates, sub-micron-structured surfaces and nano-structured surfaces. In general, the more structured a surface, or the higher the surface area of a reflective substrate, the less likely the surface will be prone to fouling after disposition of a liquidphobic structure (e.g., a hydrophobic coating).

Various methods can be used to generate a sub-micron structured surface on the reflective. Suitably, the sub-micron or nano-structured surface is optically clear. For example, a nanostructure, such as a nanowire, nanofiber, nanocrystal, nanorod, nanoparticle (e.g., a spherical nanoparticle), nanosphere, nanotube, etc., can be generated on the surface of the reflective material. In exemplary embodiments, a nanofiber is generated on the surface of a reflective material.

As disclosed in U.S. Patent Application Pub. 20050181195 and U.S. patent application Ser. No. 11/869,508, filed Oct. 9, 2007, the disclosures of each of which are incorporated by reference herein in their entireties, nanofibers refer to elongated nanostructures, typically characterized by at least one cross-sectional dimension less than about 1000 nm, e.g., less than about 500 nm, less than about 250 nm, less than about 100 nm, less than about 50 nm, less than about 40 nm, less than about 30 nm, less than about 20 nm, less than about 10 nm, or even about 5 nm or less. In many cases the region or characteristic dimension will be along the smallest axis of the structure. Nanofibers typically have one principle axis that is longer than the other two principle axes and, thus, have an aspect ratio greater than one, an aspect ratio of 2 or greater, an aspect ratio greater than about 10, an aspect ratio greater than about 20, and often an aspect ratio greater than about 100, 200, 500, 1000, or 2000.

Nanofibers for use in the practice of the present invention suitably comprise any of a number of different materials and can be fabricated from essentially any convenient material or materials. In some typical embodiments herein, the nanofibers of the invention comprise a non-carbon or inorganic material. Also, in some embodiments, the nanofibers comprise silicon or a silicon containing compound (e.g., a silicon oxide). In certain embodiments, the nanofibers range in length from about 10 nm to about 200 μm, or from about 20 nm to about 100 μm, or from about 20 nm or 50 nm to about 500 nm. Suitably the nanofibers will be coated with a hydrophobic, lipophobic, amphiphobic or other liquidphobic coating.

The term nanofiber can optionally also include such structures as, e.g., nanowires, nanowhiskers, semi-conducting nanofibers and non-carbon nanotubes (e.g., boron nanotubes or nanotubules) and the like. Additionally, in some embodiments herein, nanocrystals or other similar nanostructures can also be used in place of more "typical" nanofibers to produce liquidphobic surfaces. For example, nanostructures having smaller aspect ratios (e.g., than those described above), such as nanorods, nanotetrapods, nanoposts (e.g., non-silicon nanoposts), and the like are also optionally included within the nanofiber definition herein (in certain embodiments). Examples of such other optionally included nanostructures can be found, e.g., in published PCT Application No. WO 03/054953 and the references discussed therein, all of which are incorporated herein by reference in their entirety for all purposes.

Suitably, nanofibers for use in the practice of the present invention will comprise semiconductor materials or semiconductor elements such as those disclosed in U.S. patent application Ser. No. 10/796,832, and include any type of semiconductor, including group II-VI, group III-V, group IV-VI and group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Ge_3N_4$, (Al, Ga, In)$_2$ (S, Se, Te)$_3$, Al$_2$CO, and an appropriate combination of two or more such semiconductors. In further embodiments, the nanofibers can comprise materials such as metals, polysilicons, polymers, insulator materials, etc. Suitable metals include, but are not limited to, Pd, Pt, Ni, W, Ru, Ta, Co, Mo, Ir, Re, Rh, Hf, Nb, Au, Ag, Fe, Al, WN$_2$ and TaN. Suitable insulator materials include, but are not limited to, SiO$_2$, TiO$_2$ and Si$_3$N$_4$.

Common methods for making nanofibers include vapor liquid solid growth (VLS), laser ablation (laser catalytic growth) and thermal evaporation. See, for example, Morales et al. (1998) "A Laser Ablation Method for the Synthesis of Crystalline Semiconductor Nanowires" *Science* 279, 208-211 (1998). In one exemplary approach, a hybrid pulsed laser ablation/chemical vapor deposition (PLA-CVD) process for the synthesis of semiconductor nanofibers with longitudinally ordered heterostructures is used. See, Wu et al. (2002) "Block-by-Block Growth of Single-Crystalline Si/SiGe Superlattice Nanowires," *Nano Letters* 2:83-86.

In yet another approach, substrates and self assembling monolayer (SAM) forming materials can be used, e.g., along with microcontact printing techniques to make nanofibers, such as those described by Schon, Meng, and Bao, "Self-assembled monolayer organic field-effect transistors," *Nature* 413:713 (2001); Zhou et al. (1997) "Nanoscale Metal/Self-Assembled Monolayer/Metal Heterostructures," *Applied Physics Letters* 71:611; and WO 96/29629 (Whitesides, et al., published Jun. 26, 1996).

Growth of nanofibers, such as nanowires, having various aspect ratios, including nanowires with controlled diameters, is described in, e.g., Gudiksen et al. (2000) "Diameter-selective synthesis of semiconductor nanowires" *J. Am. Chem. Soc.* 122:8801-8802; Cui et al. (2001) "Diameter-controlled synthesis of single-crystal silicon nanowires" *Appl. Phys. Lett.* 78: 2214-2216; Gudiksen et al. (2001) "Synthetic control of the diameter and length of single crystal semiconductor nanowires" *J. Phys. Chem. B* 105:4062-4064; Morales et al. (1998) "A laser ablation method for the synthesis of crystalline semiconductor nanowires" *Science* 279:208-211; Duan et al. (2000) "General synthesis of compound semiconductor nanowires" *Adv. Mater.* 12:298-302; Cui et al. (2000) "Doping and electrical transport in silicon nanowires" *J. Phys. Chem. B* 104:5213-5216; Peng et al. (2000), supra; Puntes et al. (2001), supra; U.S. Pat. No. 6,225,198 to Alivisatos et al., supra; U.S. Pat. No. 6,036,774 to Lieber et al. (Mar. 14, 2000) entitled "Method of producing metal oxide nanorods"; U.S. Pat. No. 5,897,945 to Lieber et al. (Apr. 27, 1999) entitled "Metal oxide nanorods"; U.S. Pat. No. 5,997,832 to Lieber et al. (Dec. 7, 1999) "Preparation of carbide nanorods"; Urbau et al. (2002) "Synthesis of single-crystalline perovskite nanowires composed of barium titanate and strontium titanate" *J. Am. Chem. Soc.*, 124, 1186; Yun et al. (2002) "Ferroelectric Properties of Individual Barium Titanate Nanowires Investigated by Scanned Probe Microscopy" *Nano Letters* 2, 447; and published PCT application Nos. WO 02/17362, and WO 02/080280.

The present invention also optionally can be used with structures that may fall outside of the size range of typical nanostructures. For example, Haraguchi et al. (U.S. Pat. No. 5,332,910) describe nanowhiskers which are optionally used herein. Semi-conductor whiskers are also described by Haraguchi et al. (1994) "Polarization Dependence of Light Emitted from GaAs p-n junctions in quantum wire crystals" *J. Appl. Phys.* 75(8): 4220-4225; Hiruma et al. (1993) "GaAs Free Standing Quantum Sized Wires," *J. Appl. Phys.* 74(5): 3162-3171; Haraguchi et al. (1996) "Self Organized Fabrication of Planar GaAs Nanowhisker Arrays, and Yazawa (1993) "Semiconductor Nanowhiskers" *Adv. Mater.* 5(78):577-579. Such nanowhiskers are optionally employed as the nanofibers components of the surfaces of the invention.

In still further embodiments, methods of generating a sub-micron-structured surface on the surface of a reflective substrate include disposing a layer of micron-sized (e.g., 1 to 10s of μm) or nano-sized (e.g. 1 to 100s of nm) particles, for example, colloidal silica or submicon silica microspheres (e.g., silica or fumed silica particles), on the substrate. Such particles can be disposed on the reflective substrate directly if the surface comprises the appropriate surface charge, or the surface of the reflective substrate can be first treated to form an intermediate adhesion layer such that the surface of the substrate has the appropriate charge. For example, the surface of a reflective material can be treated so as to generate a positive surface. Thus, in suitable embodiments, the present invention provides methods of disposing a liquidphobic structure on a reflective substrate comprising disposing a sub-micron-structured surface on the reflective substrate and disposing a liquidphobic structure on the sub-micron-structured surface.

For example, a glass surface which is negatively charged at pH 7 can be coated with polylysine or soluble alumina (or example, by soaking the surface in such solutions) so as to render the surface positively charged at pH 7. Then, micro or nanoparticles, for example silica or fumed silica particles (negatively charged at pH 7), can be disposed on the surface so as to adhere to the positively charged surface.

In further embodiments a thin, optically clear alumina layer can be disposed on the surface of the reflective material, followed by the generation of a sub-micron-structured surface (including a nano-structured surface). For example, the alumina layer can simply be heated, e.g., in a boiling liquid such as water, so as to form a sub-micron or nano-structured surface. Generation of a sub-micron or nano-structured surface by heating can also be used directly on materials that comprise alumina or aluminum, for example, the surface of reflective spheres (discussed in greater detail herein).

It should be noted that the surface of the reflective substrate can be smooth, or can comprise a sub-micron-structured (or micron-sized) surface already, prior to the addition of a sub-micron structured surface. In further embodiments, the surface of the reflective material can be roughened (so long as the roughening does not deleteriously affect the reflective properties of the material) prior to the addition of a liquidphobic structure. Exemplary methods of roughening a surface include mechanical roughening, chemical roughening, etc.

Following the generation of a sub-micron-structured surface on a reflective substrate, a liquidphobic structure can then be disposed on the surface. As discussed herein, suitably the liquidphobic structure is a hydrophobic coating, including those described throughout. Exemplary hydrophobic coatings include perfluorinated organic coatings. Thus, in exemplary embodiments, a perfluorinated silane layer can be disposed on a sub-micron-structured surface comprising silica or fumed silica.

As discussed herein, suitably the methods of the present invention provide reflective surfaces which are non-fouling such that at least 50% of the reflective properties of the reflective substrate are maintained following contact with a liquid (including biological fluids).

The present invention also provides various articles comprising reflective substrates which have been coated with a liquidphobic structure using the various methods described herein. For example, in one embodiment, the present invention provides a reflective sphere comprising a hydrophobic coating on a surface of the sphere, wherein the sphere substantially maintains its reflective properties after the sphere is contacted with a liquid.

In suitable embodiments, the reflective spheres comprise a perfluorinated organic coating, such as a perfluorinated silane. Such a coating can be directly disposed on the surface of the reflective material, or can be disposed on a sub-micron-structured layer (e.g., a layer of silica particles) on the reflective material. As discussed throughout, suitably the reflective sphere maintains at least about 50% of its reflective properties after contact with a liquid, for example a biological fluid.

The methods, objects and products of the present invention have applications in various areas. For example, reflective films, reflective tapes, reflective fabrics and marker dots can be used in various methods for marking, locating and motion tracking Applications of reflective marker dots on fabrics can be used in crash-test dummy suits, in industrial applications such as tracking time-in-motion studies, in motion sensing spots or markers (e.g., reflective markers on firefighter's uniforms), etc.

In additional embodiments, the reflective objects of the present invention, such as reflective spheres, can be used in biomedical applications. For example, reflective spheres can be used in medical applications such as in connection with surgical robotics and navigation systems. In such applications, reflective spheres (or other shaped objects) are placed on a surgical instrument or apparatus. Light emitting diodes which emit light (e.g., infrared light), positioned with cameras, then shine light on the reflective spheres. The reflected light is then captured by the camera and then fed to a computer, which translates the information to form an anatomical map or positional diagram of the instrument. U.S. Pat. No. 6,351,659, the disclosure of which is incorporated by reference herein in its entirety, describes one referencing system that utilizes such reflective spheres. The referencing system operates with passive reflectors instead of active signal emitters, this referencing system being employed for operations, including neurosurgical instruments and apparatus employed in the operation. The system involves the application of a source of preferably infrared radiation, at least two mapping or referencing cameras and a computer unit with a graphic display terminal connected to the cameras. The reflector referencing system comprises at least two reflectors which can be applied in a replaceable manner via adapters to instruments or apparatus employed in the operation, i.e. in an arrangement which is exclusively characteristic for this array of reflectors. Each surgical instrument reflects an image that can be sensed exclusively for the particular instrument concerned.

Thus, in further embodiments, the present invention provides methods of performing a medical procedure using a surgical navigation system on a patient. The methods suitably comprise placing one or more reflective spheres on a surgical instrument or apparatus. Suitably, the reflective spheres comprise a liquidphobic coating (e.g., a hydrophobic coating) on a surface of the spheres. As described herein, the use of a liquidphobic coating allow the spheres to substantially maintain their reflective properties after the spheres are contacted with a biological fluid. A light is then shined on the reflective spheres. Reflected light from the spheres is then captured with a camera or other suitable device. The location and/or position of the spheres are then registering and/or tracked. Suitably, the relative locations and/or positions of any one of a) the spheres, b) the patient's anatomy (e.g., location of bones, skin, organs, muscles, blood vessels, etc.) and/or c) the instrument or the apparatus are registered, thereby tracking the location and/or position of the instrument, and/or the apparatus, and/or the patient's anatomy with respect to each other. Thus, the locations and/or positions of the various elements can be determined relative to one another such that an anatomical map of the patient, or a positional/locational diagram of the instrument or apparatus can be prepared showing the instrument or apparatus in relation to a patient's anatomy, and/or in relation to itself.

As discussed throughout, suitably the reflective sphere comprises a hydrophobic coating comprising a sub-micron-structured surface on the surface of the sphere and a hydrophobic coating disposed on the sub-micron-structured surface. Suitable hydrophobic coatings are described throughout, including a perfluorinated organic coating. In exemplary embodiments, the reflective sphere comprises a sub-micron-structured layer of silica particles and a perfluorinated silane coating on the silica particles. As noted herein, suitably the reflective spheres substantially maintain their reflective properties after contact with a biological fluid such that at least 70% of the reflected light (e.g., at least 80% or at least 90%) from the sphere is captured by the camera or other device.

Use of non-fouling reflective materials of the present invention can eliminate the need to clean or replace the reflective materials in the various applications, therefore saving time, for example in an industrial (e.g., machine replacement) or surgical setting.

It will be readily apparent to one of ordinary skill in the relevant arts that other suitable modifications and adaptations to the methods and applications described herein can be made without departing from the scope of the invention or any embodiment thereof. Having now described the present invention in detail, the same will be more clearly understood by reference to the following examples, which are included herewith for purposes of illustration only and are not intended to be limiting of the invention.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

All publications, patents and patent applications mentioned in this specification are herein incorporated by reference to the same extent as if each individual publication, patent or patent application was specifically and individually indicated to be incorporated by reference.

What is claimed is:

1. A reflective substrate comprising a reflective sphere which is configured to be placed on a surgical instrument for use in surgical robotic and navigation systems, the reflective sphere comprising a, liquidphobic structure comprising an organic coating on a sub-micron structured surface of the sphere, wherein the sub-micron textured surface comprises fumed silica nanoparticles adhered to the sphere, and wherein the sphere substantially maintains its reflective properties after the sphere is contacted with a liquid.

2. The reflective substrate of claim 1, wherein the substrate is a retroreflective substrate.

3. The reflective substrate of claim 1, wherein the liquidphobic structure comprises a super-hydrophobic coating.

4. The reflective substrate of claim 1, wherein the substrate maintains at least 70% of its reflective properties after contact with a liquid.

5. The reflective substrate of claim 1, wherein the substrate maintains its reflective properties after contact with a biological fluid.

6. The reflective substrate of claim 1, wherein the organic coating comprises a perfluorinated silane hydrophobic coating.

* * * * *